Aug. 10, 1926.

E. H. JOHNSON

EXTRUDING MACHINE

Filed May 12, 1924    2 Sheets-Sheet 1

1,595,470

Inventor
Edgar H. Johnson
By Wooster & Davis
Attorneys

Aug. 10, 1926.

E. H. JOHNSON 1,595,470

EXTRUDING MACHINE

Filed May 12, 1924    2 Sheets-Sheet 2

Inventor

Edgar H. Johnson

By Wooster & Davis

Attorneys

Patented Aug. 10, 1926.

1,595,470

UNITED STATES PATENT OFFICE.

EDGAR H. JOHNSON, OF STAMFORD, CONNECTICUT.

EXTRUDING MACHINE.

Application filed May 12, 1924. Serial No. 712,716.

This invention relates to extruding machines, and has for an object to provide improved means for feeding the plastic material to the die and giving the proper pressure thereto.

It is also an object of the invention to provide a feeding mechanism of this type which will have a greatly increased capacity over the devices now generally used.

I have illustrated my invention as applied to a wire covering machine, but I wish it to be understood that this device is not limited for use with wire covering machines, as it will be obvious it may be used in other types of devices where it is required that plastic material be forced or fed under high pressure.

In wire covering machines or the like now generally in use where some suitable plastic material, such as a rubber composition, is extruded through a die onto the wire as it passes through the die, or where it is passed through dies for other purposes or through strainers or the like, a worm or screw feed is generally employed to feed the plastic material to the extruding chamber of the die, and to produce the pressure thereon which is employed to extrude the material through the die. With this type of feed the pressure on the plastic material in the die cannot be made to exceed a certain amount, as above this point it will rotate with the screw or worm and will not be fed forwardly, and therefore, the output of this type of machine is limited. This is especially true where the plastic material used is quite soft. In fact, it is difficult under these conditions to obtain sufficient pressure on the material to properly extrude it.

I overcome these difficulties and greatly increase the output of the machine by placing between the ordinary worm or screw feed and the extruding die a positively acting feeding device having practically no slippage even when feeding a comparatively soft material. For this purpose I have found that rotating elements having intermeshing projections similar to the teeth of gears work perfectly and increase the pressure on the plastic material in the extruding die to the proper extent, and also feed this material to the die in such quantities as to greatly increase the output of the machine. The screw feed or conveyor is thus used to feed the plastic material to the positively acting feeding device under pressure which it should be in order that this device may operate at its greatest capacity as the plastic material is required to get into the spaces between the projections on the rotating elements, and then this positively acting device imparts the proper pressure to the material for forcing it through the die.

With the foregoing and other objects in view, I have devised a device embodying my invention illustrated in the accompanying drawings forming a part of this specification, similar reference characters being employed throughout the various figures to designate corresponding elements. In these drawings, Fig. 1 is a longitudinal section through a device embodying my invention employed for covering wire.

Figure 1:
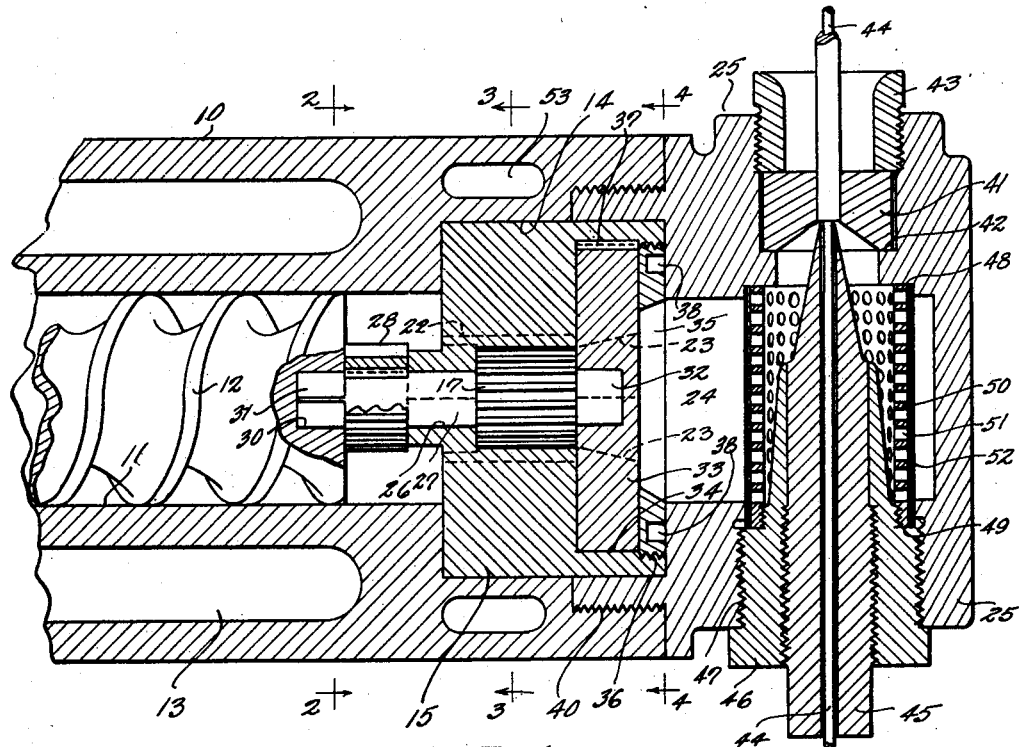
Figure 2:
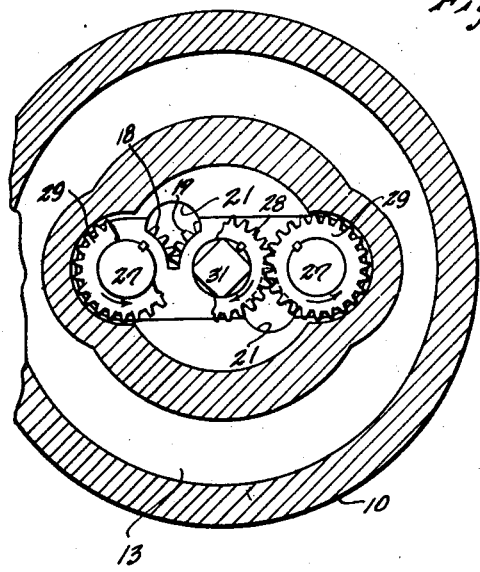
Fig. 2 is a transverse section thereof substantially on line 2—2 of Fig. 1.

In the drawings I have shown merely the elements involved in my invention, any of the usual and suitable driving mechanism being employed therefor and not being illustrated as they form no part of my invention. I have illustrated a cored cylinder 10 having a cylindrical bore 11 for the screw feed or conveyor 12, there being any suitable means provided for rotating this conveyor which is not shown, and it being understood that there is also a suitable feed opening through which the plastic material is fed to this conveyor. The bore 11 is surrounded by a suitable chamber 13 through which a cooling or heating fluid may be passed as desired for maintaining the proper temperature for the plastic material, and to keep it at the proper consistency for extruding purposes. In order to secure the best feeding effect of the screw and secure as great a pressure as possible therefrom on the material as it leaves the conveyor, the diameter of the bore 11 is made substantially the same as the diameter of the screw.

Figure 3:
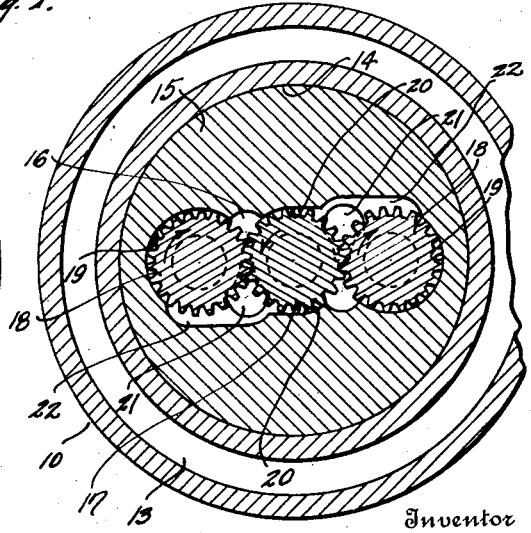
Fig. 3 is a transverse section thereof substantially on line 3—3 of Fig. 1.
Figure 4:
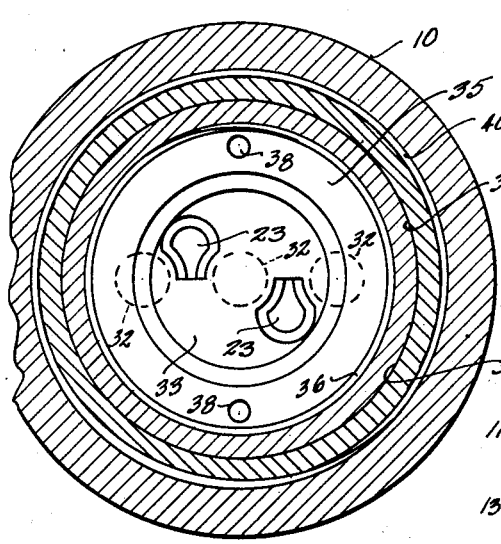
Fig. 4 is a transverse section thereof substantially on line 4—4 of Fig. 1.
Figure 5:
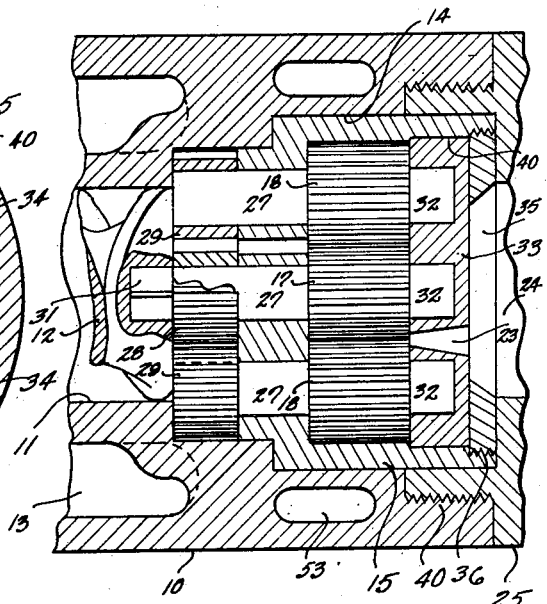
Fig. 5 is a longitudinal section through the positively acting feeding mechanism on a plane substantially at right angles to the plane of Fig. 1.
Figure 6:
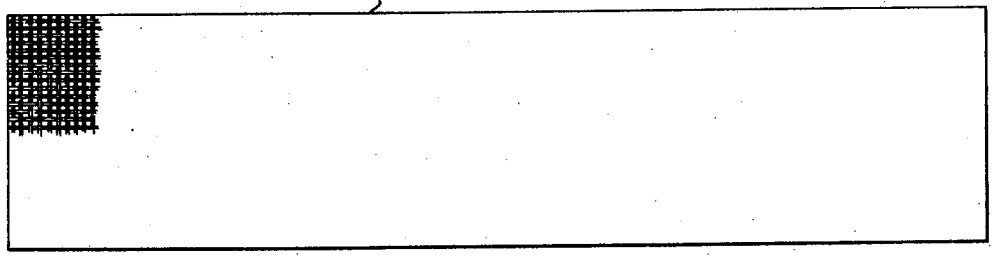
Fig. 6 is a plan view of a strainer.
Figure 7:
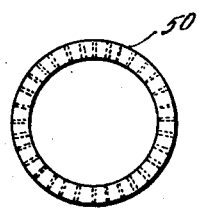
Fig. 7 is an end view of the support for the strainer.
Figure 8:
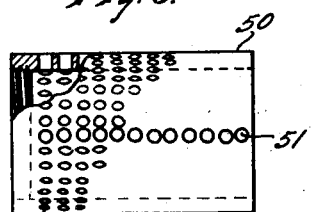
Fig. 8 is a side elevation thereof.

The cylinder 10 is provided with a compartment 14 located at the discharge end of the screw conveyor and in this compartment is mounted a casing 15. This casing has an elongated chamber 16 in which are mounted the positively acting feeding means comprising rotating gear like elements 17 and 18, these elements being provided with projections on their peripheries similar to gear teeth which intermesh, as shown in Fig. 3. In the present embodiment I have shown three of these elements the outer elements 18 intermeshing with the intermediate elements 17 on the opposite sides thereof. The chamber 16 has curved walls 19 and 20 closely adjacent the outer edges of the projections or teeth of the elements so as to prevent slippage and to insure a positive feed of the plastic material by these elements. On the side of the casing toward the discharge end of the screw conveyor are inlet openings 21 leading to the sides of the intermeshing portions of these elements where the projections or teeth separate as the elements rotate, the direction of rotation being indicated by the arrows. To facilitate the proper entry of the plastic material to the spaces between the teeth or projections enlargements 22 are provided in the chamber 16 extending across the same from the inlet openings. The plastic material is forced into these enlargements by the screw conveyor under pressure and is given plenty of time in these enlargements to pass into the spaces between the projections or teeth of the gear elements before they pass to the curved walls 19 and 20. On the opposite sides of the intermeshing portions, as the teeth come together or intermesh they force the plastic material from the spaces between the teeth and through the outlets 23 into the extruding chamber 24 of the die head 25. The teeth or projections on the gear elements 17 and 18 are preferably not true gear teeth but are made so that they contact or engage each other throughout substantially the entire time the teeth are entering or leaving the grooves so that the leakage of the plastic material is reduced to a minimum.

The casing 15 is provided with suitable bearings 26 for the spindles 27 of the gear elements, and mounted on these spindles are intermeshing driving gears 28 and 29. One of these spindles, preferably the intermediate spindle, has a driving connection with the screw conveyor 12 as for instance by a squared socket 30 receiving the squared end 31 of the spindle. The provision of these driving gears relieves the teeth or projections on the elements 17 and 18 from the driving strain so that their function is merely to feed the plastic material and impart the proper pressure thereto. As the plastic material passes through this feeding mechanism it is thoroughly masticated and given a uniform consistency by the action of the driving gears and the gear elements 17 and 18. The opposite ends 32 of the spindles 27 are mounted in bearings in a disc 33 which is carried by the casing 15. The outlet end of the casing 15 is counterbored, as shown at 34, to receive this disc and it is clamped in position by a ring 35 threaded into the casing, as shown at 36. Rotation of the disc is prevented by a key 37. The ring 35 is provided with suitable sockets 38 for the use a spanner wrench for use in applying or removing. The disc 33 is also provided with the outlet openings 23 leading from the discharge side of the gear elements 17 and 18 for passage of the plastic material to the die. These openings are preferably flared outwardly, as shown.

The cylinder 10 is internally threaded, as shown at 40 for the purpose of securing the die head 25 thereto, and this die head also securely clamps the casing 15 in the compartment of the cylinder. As pressure in the die chamber is very high, approximately ten thousand pounds per square inch, the means shown for mounting the casing and the die head is very effective in providing tight joints to prevent leakage of the material under this high pressure. It is, however, simple and may be easily disconnected to allow removal of the feeding mechanism for renewal or repair.

The die is indicated at 41 mounted in a recess 42 in the head 25, and is clamped in position by the threaded bushing 43. The wire 44 is led to the opening in the die by a guide 45 mounted in the follower 46 threaded into the head on the opposite side of the die, as shown at 47. Means is provided for straining the plastic material, this strainer being located between the feeding means and the die. I have shown a very effective strainer in the drawings though other types of strainers may be used if desired. There is a shoulder 48 provided inwardly of the die and an opposed shoulder 49 on the follower, and mounted between these shoulders is a cylinder 50 provided with perforations 51. Wrapped about this cylinder is a screen 52 of any suitable material, such for example as a wire mesh or perforated sheet metal, the cylinder 50 forming a suitable backing or support for the screen. It will be apparent that as the plastic material is forced to the die it will be forced through the screen and large particles of dirt or foreign matter will be retained thereby. This screen may be easily removed for cleaning or renewal by merely removing the follower.

The operation will be obvious from the foregoing description. The plastic material may be fed to the conveyor either in chunks or in strips as desired. It is conveyed along the cylinder by the action of the screw 12 and is kept at the proper temperature by the fluid in the chambers 13 and 53. It is forced by the conveyor under pressure through the inlet openings 21 to the gear elements 17 and 18 by which it is fed into the extruding chamber 24 under very high pressure, and from which it passes through the screen to the die. As it passes through the die it draws the wire therethrough as it covers it, no other feeding mechanism being required. It has been found in practice that this positive feeding device easily gives the required pressure, a common pressure secured being approximately ten thousand pounds per square inch, and that it feeds the material in such quantities as to greatly increase the output of the machine. As there is practically no slippage in the positive feeding device a constant and sufficient supply of plastic material at the die is assured at all times.

Having thus set forth the nature of my invention what I claim is:

1. An extruding machine comprising a conveyor for plastic material, a positively acting feeding mechanism connected with said conveyor to receive the plastic material therefrom, said feeding mechanism comprising a casing having a chamber therein, an intermediate gear element, a pair of gear elements intermeshing therewith on opposite sides thereof, said elements being mounted to rotate in said chamber and having a portion of their peripheries closely adjacent the walls thereof, there being inlet openings from the conveyor to said chamber on one side of said gear elements and an outlet from the opposite side thereof, and an extruding die connected with said outlets.

2. An extruding machine for plastic material comprising a cylinder, a screw conveyor in said cylinder, a positively acting feeding mechanism connected with said cylinder to receive the plastic material therefrom, said feeding mechanism comprising intermeshing gear elements, intermeshing driving gears for said elements located between said elements and the conveyor, a driving connection from the conveyor to one of said gears, and an extruding die on the opposite side of the elements and arranged to receive plastic material therefrom.

3. An extruding machine for plastic material comprising a cylinder, a screw conveyor in said cylinder, said cylinder being provided with a compartment at the discharge end of said conveyor, a casing mounted in said compartment provided with an elongated chamber, intermeshing gear elements mounted in said chamber and having a portion of their peripheries closely adjacent the walls thereof, said casing being provided with an inlet from the cylinder to one side of said elements and an outlet from the opposite side thereof, and an extruding die communicating with said outlet.

4. An extruding machine for plastic material comprising a cylinder, a screw conveyor in said cylinder, said cylinder being provided with a compartment at the discharge end of said conveyor, a casing mounted in said compartment provided with an elongated chamber, intermeshing gear elements mounted in said chamber and having a portion of their peripheries closely adjacent the walls thereof, intermeshing driving gears for said elements located between said elements and the conveyor, a driving connection from the conveyor to one of said gears, and an extruding die on the opposite side of said elements and arranged to receive plastic material therefrom.

5. An extruding machine for plastic material comprising a cylinder, a screw conveyor in said cylinder, a casing mounted at the discharge end of said cylinder and provided with an elongated chamber, an intermediate gear element and other gear elements intermeshing therewith on the opposite sides thereof in said chamber and having a portion of their peripheries closely adjacent the walls of the chamber, said casing being provided with inlets leading from the conveyor to one side of the intermeshing portions of said elements and outlets leading from said elements on the opposite side of the said intermeshing portions, there being enlargements in the chamber leading from said inlets to the inlet sides of the gear elements, and an extruding die communicating with said outlets.

6. An extruding machine for plastic material comprising a feeding device, a positively acting feeding means arranged to receive plastic material from said device, said feeding means comprising a casing having a chamber therein and intermeshing gear elements in said chamber with a portion of their peripheries closely adjacent the walls of the chamber, said casing being provided with an inlet leading to one side of the intermeshing portions of said elements and an outlet leading from the other side of said portions, said chamber being provided with an enlargement leading from the inlet opening to the inlet sides of said elements, and an extruding die communicating with said outlet.

7. An extruding machine for plastic material comprising a feeding device, a positively acting feeding means arranged to receive plastic material from said device, said feeding means comprising a chamber and intermeshing gear elements in said chamber with a portion of their peripheries closely adjacent the walls of the chamber, there being an inlet to one side of said intermeshing portions leading from the feeding device and an outlet from the other side of said intermeshing portions, an extruding die communicating with said outlet, and a strainer for the plastic material between said outlet and the die.

8. An extruding machine for plastic material comprising a feeding device, an extruding die, a positively acting feeding means arranged to receive plastic material from said device and force it through the die, a perforated backing member between the positively acting feeding means and the die, and a screen for straining the plastic material supported by said backing member between said member and the feeding means.

9. An extruding machine for plastic material comprising a feeding device, an extruding die, a positively acting feeding means arranged to receive plastic material from said feeding device and force it through the die, a perforated tube surrounding the inlet to said die, and a screen for straining the plastic material embracing said perforated tube.

10. An extruding machine for plastic material comprising a feeding device, a die head, an extruding die carried by said head, a positively acting feeding means arranged to receive plastic material from said device and force it into said head and through the die, said head being provided with a shoulder about the passage to the die, a perforated tube seated on said shoulder, a foraminous screen embracing said tube forming a strainer for the plastic material, and a follower removably secured to said head and provided with a shoulder for the other end of said tube.

11. An extruding machine comprising a cylinder, a screw conveyor in said cylinder, said cylinder being provided with a compartment at the discharge end of said conveyor, a casing removably mounted in said compartment, positively acting feeding means mounted in said casing arranged to receive plastic material from said feeding device and discharge it under an increased pressure, a die head arranged in position to receive the plastic material from said casing, means for securing the die head to the cylinder and securing the casing in said chamber, and an extruding die carried by said head.

12. An extruding machine comprising a cylinder, a screw conveyor in said cylinder, said cylinder being provided with a compartment at the discharge end of said conveyor, a casing removably mounted in said compartment, positively acting feeding means mounted in said casing arranged to receive plastic material from said feeding device and discharge it under an increased pressure, a die head having threaded engagement with said cylinder and arranged to secure the casing in said compartment, and an extruding die carried by said head and communicating with the outlet from said casing.

13. An extruding machine comprising a cylinder, a screw conveyor in said cylinder, said cylinder being provided with a compartment at the discharge end thereof, a casing mounted in said compartment and provided with an elongated chamber open at one side, intermeshing gear elements mounted in said chamber and having a portion of their peripheries closely adjacent the walls thereof, a disc in the open side of the chamber, spindles for said gear elements having bearings in the casing and disc, a driving connection from one of said spindles to the conveyor, said casing and disc being provided with openings on opposite sides of the gear elements for passage of the plastic material, a die head having threaded engagement with the cylinder and engaging one end of the casing to retain it in said compartment, said die head being arranged to receive plastic material from said gear elements, and an extruding die carried by said head.

14. An extruding machine for plastic material comprising an extruding die, means for feeding plastic material to said die under pressure, and a tubular strainer for the plastic material between the feeding means and said die and surrounding the entrance to the die.

15. An extruding machine for plastic material comprising an extruding die, a cylinder, a rotating worm in said cylinder of substantially the same diameter as the cylinder so that it is adapted for feeding plastic material from the cylinder under pressure, a positively acting feeding means arranged to receive plastic material from said feeding device and force it through the die, and a strainer for the plastic material located between the feeding means and the die.

16. An extruding machine comprising a cylinder, a screw conveyor in the cylinder and of substantially the same diameter as said cylinder so that said conveyor is adapted to convey plastic material and discharge it from the cylinder under pressure, a positively acting feeding mechanism connected with said cylinder to receive the plastic material therefrom, said feeding mechanism comprising rotating elements having intermeshing projections, separate means for driving said elements, and an extruding die arranged to receive plastic material from the feeding mechanism.

17. An extruding machine for plastic material comprising a cylinder, a screw conveyor in said cylinder, a positively acting feeding mechanism connected with said cylinder to receive the plastic material therefrom, said feeding mechanism comprising rotating elements having intermeshing projections, intermeshing driving gears for said elements, a driving connection from the discharge end of the conveyor to one of the gears, and an extruding die arranged to receive the plastic material from the feeding mechanism.

In testimony whereof I affix my signature.

EDGAR H. JOHNSON.